US006577510B1

(12) United States Patent
Yasumura

(10) Patent No.: US 6,577,510 B1
(45) Date of Patent: Jun. 10, 2003

(54) SWITCHING POWER SUPPLY

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/030,841

(22) PCT Filed: May 11, 2000

(86) PCT No.: PCT/JP00/03037

§ 371 (c)(1), (2), (4) Date: May 21, 2002

(87) PCT Pub. No.: WO01/86795

PCT Pub. Date: Nov. 15, 2001

(51) Int. Cl.[7] .......................... H02M 3/335
(52) U.S. Cl. .......................... 363/21.02
(58) Field of Search .......................... 363/16, 19, 21.01, 363/21.02, 97, 131

(56) References Cited

U.S. PATENT DOCUMENTS

| | | | | |
|---|---|---|---|---|
| 5,025,241 A | | 6/1991 | Bouillot et al. | |
| 5,450,307 A | * | 9/1995 | Yasumura | 363/47 |
| 6,317,337 B1 | * | 11/2001 | Yasumura | 363/21.04 |
| 6,356,465 B2 | * | 3/2002 | Yasumura | 363/21.02 |
| 6,388,902 B1 | * | 5/2002 | Yasumura | 363/21.02 |
| 6,396,717 B2 | * | 5/2002 | Yasumura | 363/21.02 |
| 6,496,389 B1 | * | 12/2002 | Yasumura | 363/21.04 |

FOREIGN PATENT DOCUMENTS

| | | |
|---|---|---|
| EP | 0 443 342 A1 | 8/1991 |
| EP | 0 704 958 A1 | 4/1996 |
| JP | 2-281720 | 11/1990 |
| JP | 8-154378 | 6/1996 |
| JP | 2945061 | 6/1999 |
| JP | 2000-125552 | 4/2000 |
| JP | 2000-125559 | 4/2000 |

OTHER PUBLICATIONS

Patent Abstracts of Japan, 2000 125559, Apr. 28, 2000, vol. 2000, No. 07, Sep. 29, 2000.
Patent Abstracts of Japan, 2000 125552, Apr. 28, 2000, vol. 2000, No. 07, Sep. 29, 2000.

* cited by examiner

*Primary Examiner*—Adolf Berhane
(74) *Attorney, Agent, or Firm*—Frommer Lawrence & Haug LLP; William S. Frommer; Glenn F. Savit

(57) ABSTRACT

A power supply uses a switching element of a desired voltage withstanding property to obtain a desired conversion output. The power supply includes a converter transformer having primary and secondary windings loosely coupled to one another, and an auxiliary winding with a predetermined number of turns wound contiguously from one end of the primary winding to an end portion of the converter transformer. An input voltage smoothing capacitor is connected on one side to an end of the primary winding of the converter transformer through a forwardly directed diode. A switching element is connected to the other end of the primary winding. A control circuit controls the switching element to perform switching so that an output voltage of the secondary winding has a predetermined voltage value (or is within a predetermined voltage range). A second capacitor is coupled across opposite ends of the auxiliary winding via the forwardly directed diode, to boost-up voltage applied to the converter transformer.

8 Claims, 7 Drawing Sheets

SWITCHING POWER SUPPLY

TECHNICAL FIELD

The present invention relates to a switching power supply suitable for use, for example, with a television receiver. More particularly, the invention relates to a resonant-type of switching power supply which can effect efficient power conversion with a simple configuration.

BACKGROUND ART

Switching power supplies for use with televisions, computer monitors, and the like, are typically characterized as "soft switching", which designates operation with a sine wave, or "hard switching" designating operation with a rectangular wave. The soft switching power supplies are considered to be superior in terms of power conversion efficiency, noise level, cost, and so forth. A large screen television typically requires a switching power supply capable of operation with AC input voltage of 100V and maximum load power of 160 W.

Prior art soft switching power supplies are described, for example, in an article entitled "A New Magnetic Flux Control SMPS and the Multiscan Deflection System", by Masayuki Yasumura et al., IEEE International Conference on Consumer Electronics, Jun. 4, 1986. The switching power supplies described in that article contain four basic components: a power regulating transformer (PRT), a power isolation transformer (PIT), a converter drive transformer (CDT), and a resonant switching element. The characteristics of the PRT may be controlled by a feedback signal based on the measured output voltage, so as to adjust the switching frequency of the switching element, which in turn results in the output voltage being modified. In this manner, the output voltage is maintained in a desired range.

Present day switching power supplies of the self-excited oscillation type often have the following disadvantage: there is the possibility that a high voltage may be applied to the switching transistor, which requires the switching transistor to have a high voltage withstanding property, e.g., 1800V. Consequently, this property limits the ability to increase the switching frequency of the device because the power conversion efficiency is deteriorated by an increase of the power loss when the switching frequency is increased beyond a certain level.

In other configurations designed to alleviate this problem, universal switching transistors with lower voltage withstanding properties have been used, e.g., 1500V. However, these configurations are of increased complexity and size, requiring typically four large switching transistors and isolated signal transmission means such as a photo-coupler to keep the primary and secondary sides isolated from one another.

Accordingly, a need exists for a switching power supply capable of using a relatively low voltage withstanding transistor(s) and having a simple configuration.

DISCLOSURE OF THE INVENTION

It is therefore an object of the present invention to provide a switching power supply that uses a switching element of a desired voltage withstanding property, and which achieves a desired AC/DC conversion output.

Another object of the present invention is to provide a switching power supply with a simple configuration.

In accordance with the invention, there is provided a power supply including a converter transformer having primary and secondary windings loosely coupled to one another, and an auxiliary winding with a predetermined number of turns wound contiguously from one end of the primary winding to an end portion of the converter transformer. An input voltage smoothing capacitor is connected on one side to an end of the primary winding of the converter transformer through a forwardly directed diode. A switching element is connected to the other end of the primary winding. A control means controls the switching element to perform switching so that an output voltage of the secondary winding has a predetermined voltage value (or is within a predetermined voltage range). A second capacitor is coupled across opposite ends of the auxiliary winding via the forwardly directed diode, to boost-up voltage applied to the converter transformer.

The converter transformer may be comprised of an EE-shaped ferrite core having a pair of middle magnetic legs shorter than two pairs of outer magnetic legs thereof such that a gap is formed between the pair of middle magnetic legs. The primary winding is wound around one of the middle magnetic legs, the secondary winding is wound around the other of the middle magnetic legs, so as to provide the loose coupling between said primary and secondary windings.

The control means may be formed as a self-excited oscillation switching frequency control means for varying an inductance of a control transformer with an output voltage of the secondary winding to control an oscillation frequency. Alternatively, the control means may be formed as a separately excited oscillation switching frequency control means for detecting the output voltage of the secondary winding and controlling an oscillation frequency of an oscillation circuit with the detected value.

Advantageously, with the power supply of the present invention, the switching frequency can be controlled by separately excited oscillation, the voltage to be applied to the primary winding can be boosted up, and the voltage to be applied to the switching element can be set arbitrarily. Consequently, a desired output can be obtained using a switching element of a desired voltage withstanding property and a device having superior characteristics can be used to achieve efficient power conversion. Further, the number of parts can be reduced to reduce the area of a circuit board thereby to miniaturize the entire apparatus.

The above and other objects, features and advantages of the present invention will become apparent from the following description and the appended claims, taken in conjunction with the accompanying drawings in which like parts or elements denoted by like reference symbols.

BEST MODE FOR CARRYING OUT THE INVENTION

Figure 1:
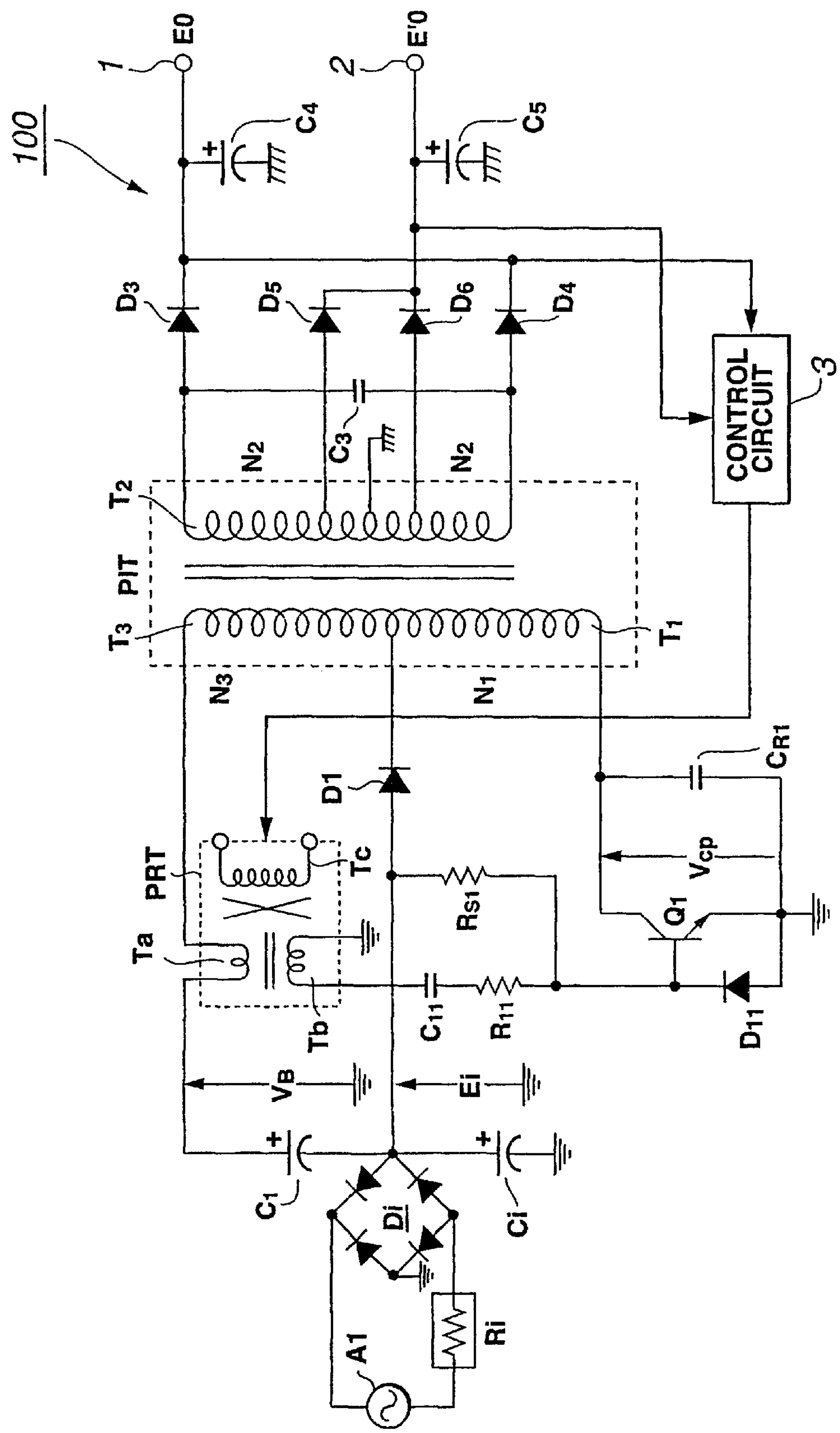
FIG. 1 is a circuit diagram of an embodiment of a power supply in accordance with the invention.

Referring to FIG. 1, a first embodiment of a power supply in accordance with the invention is schematically illustrated. Briefly, power supply 100 is an AC/DC converter which includes an orthogonal control transformer (or "power regulating transformer") PRT having a secondary winding inductance controlled by a feedback signal from a control circuit 3; an insulating converter transformer (or "power isolation transformer") PIT; and a transistor Q1 operating as a switching element, such that a self-oscillating feedback loop is formed between elements Q1, PIT and PRT. Control circuit 3 detects the output voltage of the power supply across terminals Eo and Eo', and controls the frequency of oscillation of the feedback loop in accordance with the detected output voltage to thereby maintain the output voltage in a desired range. An important aspect of power supply 100 is the provision of diode D1, capacitor C1, and a boost-up winding T3 of transformer PIT, which together enable a switching transistor with lower voltage withstanding voltage and superior characteristics to be used than would be otherwise possible, and allows the load power to be increased, as will be explained below.

A more detailed explanation of power supply 100 will now be presented. The opposite ends of an alternating current power supply A1 are connected to AC input terminals of a diode bridge circuit Di through a resistor Ri for in-rush current limitation upon connection of power supply 100 and so forth. A rectifier output terminal of the negative electrode side of the diode bridge circuit Di is grounded, and the other rectifier output terminal of the positive electrode side of the diode bridge circuit Di is grounded through a smoothing capacitor Ci. Consequently, the AC power supply A1 is full-wave rectified by the diode bridge circuit Di, and the rectified voltage is smoothed by capacitor Ci. A DC voltage Ei corresponding to an AC input voltage VAC of power supply A1 is formed on the positive electrode side of capacitor Ci.

Insulating converter transformer PIT functions to transmits power from the primary side (with windings T1 and T3) to the secondary side (winding T2) while providing DC isolation between the primary and secondary sides. The primary winding T1 has N1 turns, and a wire extending from one end of the primary winding T1 to the top end of the transformer is wound to form a boost-up winding T3 (also referred to as an auxiliary winding) having N3 turns. The primary side can also be considered a single, center tapped primary winding (comprising windings T1 and T3), with the cathode of diode D1 connected to a center tap that separates winding T1 and boost-up winding T3.

Figure 2:
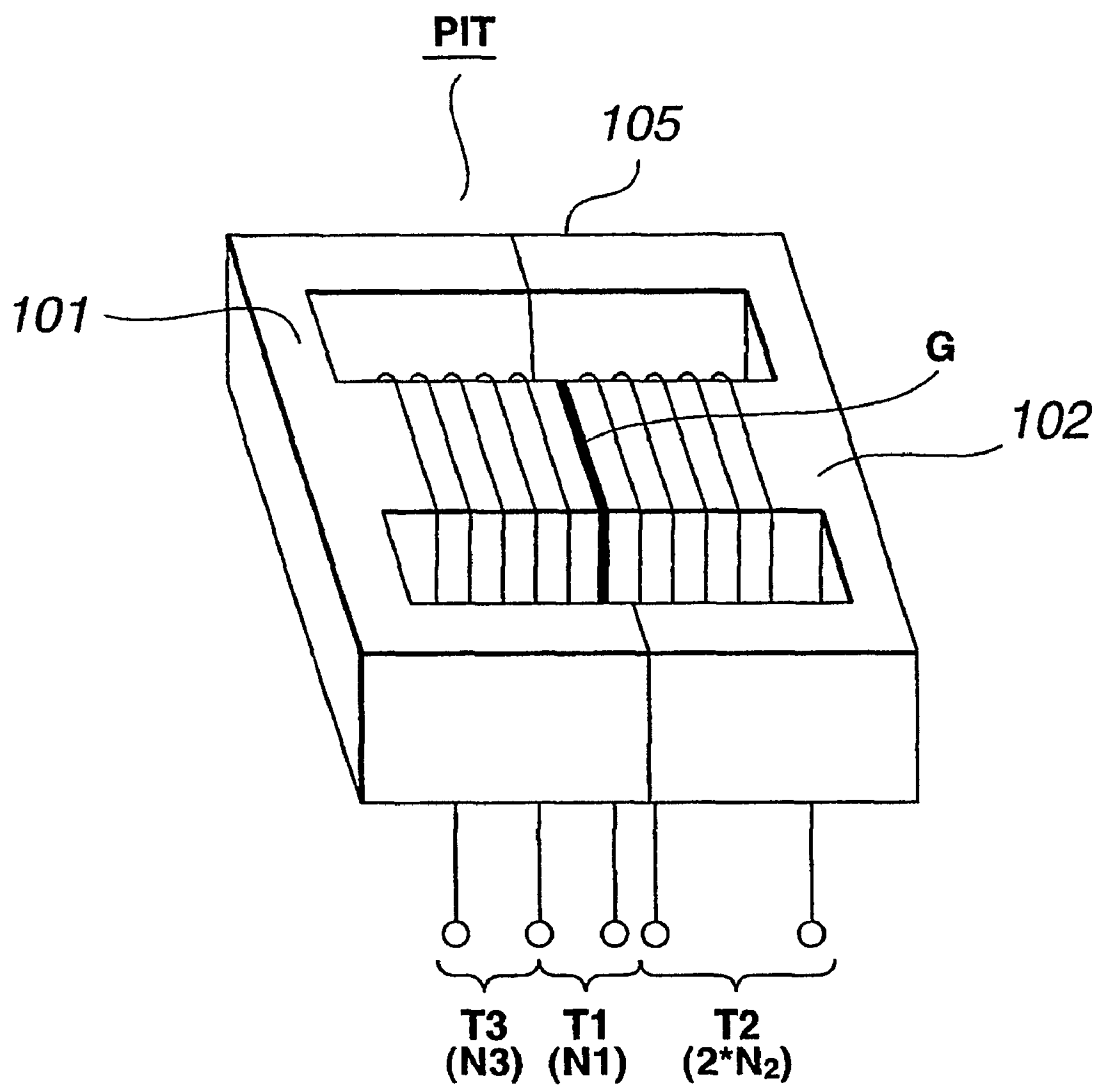
FIG. 2 is a perspective view of an insulating converting transformer that may be used within embodiments of the invention.

FIG. 2 depicts a preferable configuration for the insulating converter transformer PIT. The PIT has an EE-shaped core 105 which includes a pair of E-shaped cores 101 and 102 made of a ferrite material and combined such that magnetic legs thereof oppose each other. Primary winding T1 with N1 turns and secondary winding T2 with 2*N2 turns (where N1 is not necessarily a different number than N2) are wound separately from one another on the central magnetic legs of EE-shaped core 105 using a split bobbin whose winding portion is split between the primary and secondary sides. Boost-up winding T3 (with N3 turns) runs contiguously along the central magnetic leg of E-shaped core 101 from the end of primary winding T1. A gap G is formed between the central magnetic legs of the EE-shaped core 105. The gap G can be created by forming the central magnetic legs of the E-shaped cores 101 and 102 shorter than the two outer magnetic legs. Consequently, a loose coupling, having a lower coupling coefficient than in a conventional insulating converter transformer is obtained, and consequently, a saturation condition is less likely to occur. The coupling coefficient k in this instance is, for example, $k \approx 0.85$.

Returning to FIG. 1, the positive electrode side of capacitor Ci is connected to an end of the primary winding T1 of the insulating converter transformer PIT through the forwardly directed "boost-up" diode D1. Diode D1 is referred to as a boost-up diode because it functions in conjunction with boost-up winding T3 and capacitor C1 to boost the voltage to the primary side of the PIT. An end of "boost-up" capacitor C1 is connected to the positive electrode side of the capacitor Ci. The other end of the capacitor C1 is connected to the other end of boost-up winding T3 through a controlled winding Ta of orthogonal control transformer PRT. It is to be noted that the orthogonal control transformer PRT further has a controlled winding Tb and a control winding Tc, and the inductance values of the controlled windings Ta and Tb are varied in accordance with a control signal supplied to the control winding Tc as hereinafter described.

The other end of primary winding T1 is grounded through the collector-emitter of an npn bipolar junction transistor (BJT) Q1, and a resonance capacitor CR1 is provided in parallel with the collector-emitter of transistor Q1. A damping diode D11 is provided between the base and the emitter of transistor Q1, and the base of transistor Q1 is connected to the positive electrode side of the capacitor Ci through a "starting" resistor RS1. The base of transistor Q1 is grounded through a damping resistor R11, a resonance capacitor C11 and the controlled winding Tb of the orthogonal control transformer PRT.

The switching converter circuit is formed from the components described above. Thus, if the AC power supply A1 is applied to the switching converter circuit, then a self-excited oscillation circuit composed of the transistor Q1, resistor R11, resonance capacitor C11 and controlled winding Tb of transformer PRT is started in response to a starting current from the resistor RS1 to start the switching drive of transistor Q1. Then, within a period within which the transistor Q1 is off, resonance current in the form of a sine wave pulse is formed by a resonance circuit which is composed of leakage inductances of the controlled winding Ta of the orthogonal control transformer PRT and the boost-up winding T3 and the primary winding T1 of the insulating converter transformer PIT, the resonance capacitor CR1 and so forth.

Thereupon, a voltage corresponding to the ratio in turn number between the primary winding T1 of turn number N1 and the boost-up winding T3 of turn number N3 is generated in the boost-up capacitor C1 described above. In other words, a potential VB at the other end of the capacitor C1 is given, where the voltage drop of diode D1 is represented by VF and the voltage drop between the collector and the emitter of transistor Q1 is represented by VCE(SAT), by $$VB=[Ei-VF-VCE(SAT)]\times[(N1+N3)/N1]\approx Ei[1+(N3/N1)]$$

and resonance current corresponding to the potential VB is supplied to the primary winding T1.

Then, an arbitrary voltage is induced in secondary winding T2 in accordance with the resonance current which flows through primary winding T1. The turn number of secondary winding T2 is 2*N2, and a center tap is provided at a position of the secondary winding T2 at which the turn number is equally divided into two. The center tap is grounded on the secondary side. A capacitor C3 for resonance is provided between the opposite ends of secondary winding T2, and a voltage resonance circuit is formed from a leakage inductance of secondary winding T2 and capacitor C3.

A pair of taps at the opposite ends of secondary winding T2 of the insulating converter transformer PIT are connected to each other through forwardly directed diodes D3 and D4, and a junction between them is grounded on the secondary side through a smoothing capacitor C4. An output terminal 1 is provided at the junction. Consequently, an arbitrary DC output voltage E0 obtained by full-wave rectification of an output between the opposite ends of the secondary winding T2 is extracted from output terminal 1.

A pair of intermediate taps are provided at two arbitrary positions of secondary winding T2 which are symmetrical with each other with respect to the center tap described above. The intermediate taps are connected to each other through forwardly directed diodes D5 and D6, and a junction between them is grounded on the secondary side through a smoothing capacitor C5. Further, another output terminal 2 is provided at the junction. Consequently, a desired DC output voltage E0' obtained by full-wave rectification of an output between the arbitrary intermediate taps of the secondary winding T2 is extracted from secondary winding T2.

Figure 3:
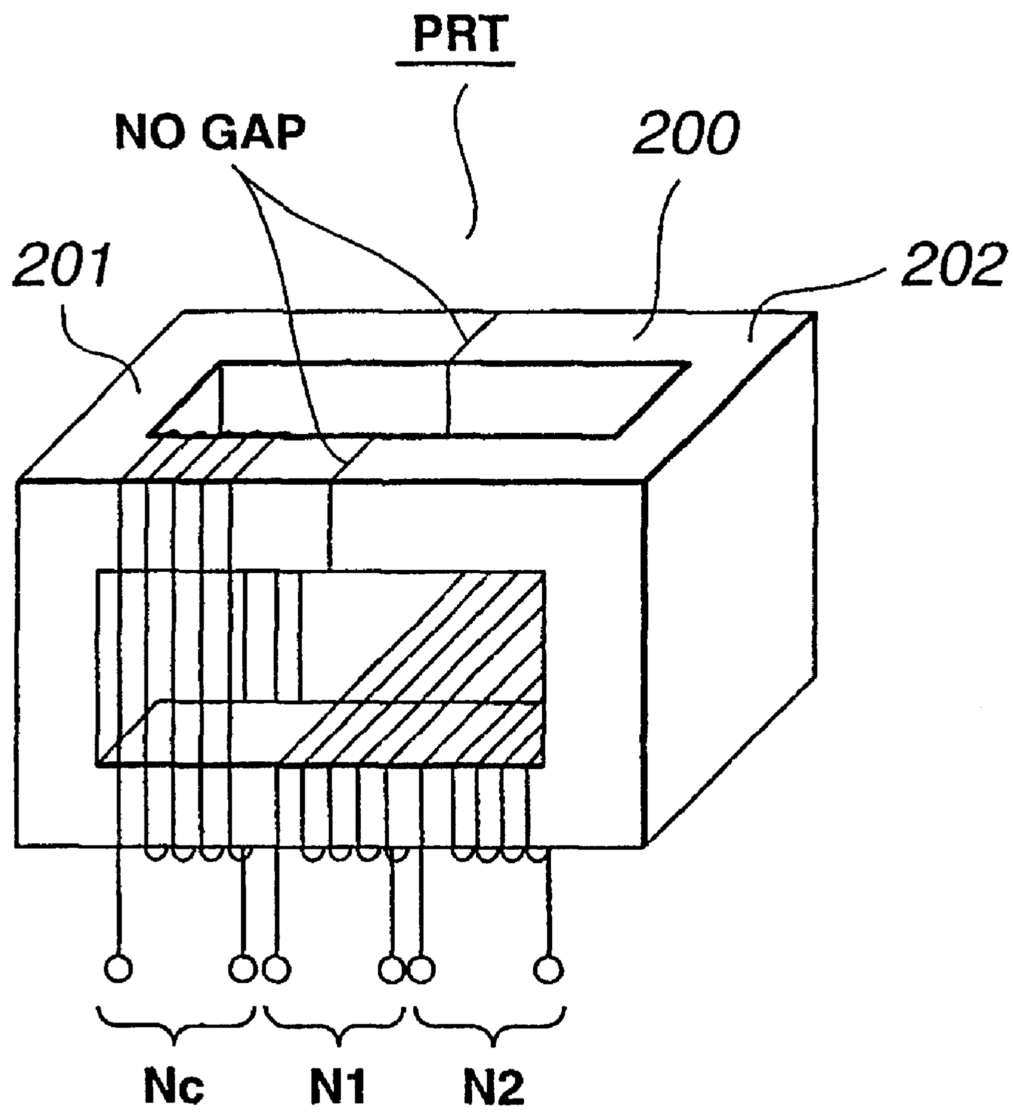
FIG. 3 is a perspective view of an orthogonal control transformer that may be used within embodiments of the invention.

The orthogonal insulating converter transformer PRT functions to transmit a switching output of the switching element Q1 to the secondary side thereof and to perform constant voltage control of the secondary side output thereof. Transformer PRT includes, for example, as shown in FIG. 3, a three dimensional core 200 which is formed such that two double channel-shaped cores 201 and 202 each having four magnetic legs are joined to each other at the ends of the magnetic legs thereof. The primary winding N1 (corresponding to controlled winding Ta of FIG. 1) and a secondary winding N2 (corresponding to controlled winding Tb of FIG. 1) are wound in the same winding direction around two predetermined ones of the magnetic legs of the three dimensional core 200 and a control winding Nc (Tc) is wound around two predetermined ones of the magnetic legs of the three dimensional core 200 such that the winding direction thereof is orthogonal to the primary winding N1 and the secondary winding N2. As a result, the orthogonal insulating converter transformer PRT is formed as a saturable reactor. In this instance, the opposing faces of the opposing legs of the double channel-shaped cores 201 and 202 are joined together and have no gap formed therebetween.

Returning to FIG. 1, the DC output voltages Eo and Eo' are detected by control circuit 3, and a control signal from the control circuit 3 is supplied to the control winding Tc of the orthogonal control transformer PRT. Consequently, the inductance values of the controlled windings Ta and Tb are controlled in accordance with the control signal from control circuit 3. Then, if the DC output voltage Eo or Eo' of the output terminal 1 or 2 varies, (or if the difference voltage Eo−Eo' varies) then the inductance values of the controlled windings Ta and Tb are varied, and the conduction angle of the transistor Q1 and the oscillation frequency of the self-excited oscillation circuit described above are controlled in a direction to cancel the variation. In this manner, the DC output voltages Eo and Eo' to be extracted from the output terminals 1 and 2 respectively, are stabilized. (Note that the DC output voltage of power supply 100 may be considered the difference between Eo and Eo'.)

In power supply 100, the voltage to be applied to switching transistor Q1 can be set arbitrarily in accordance with the ratio between the turn number N1 of primary winding T1 and the turn number N3 of boost-up winding T3. Therefore, if a universal type transistor having a voltage withstanding property of, for example, 1,500 V is used for transistor Q1, then if the turn number N3 of boost-up winding T3 is selected so as to satisfy 0.5N1 N3 N1, then the voltage to be applied to the transistor Q1 can be controlled always to 1,500 V or less. This allows use of a universal transistor having superior characteristics.

Figure 4:
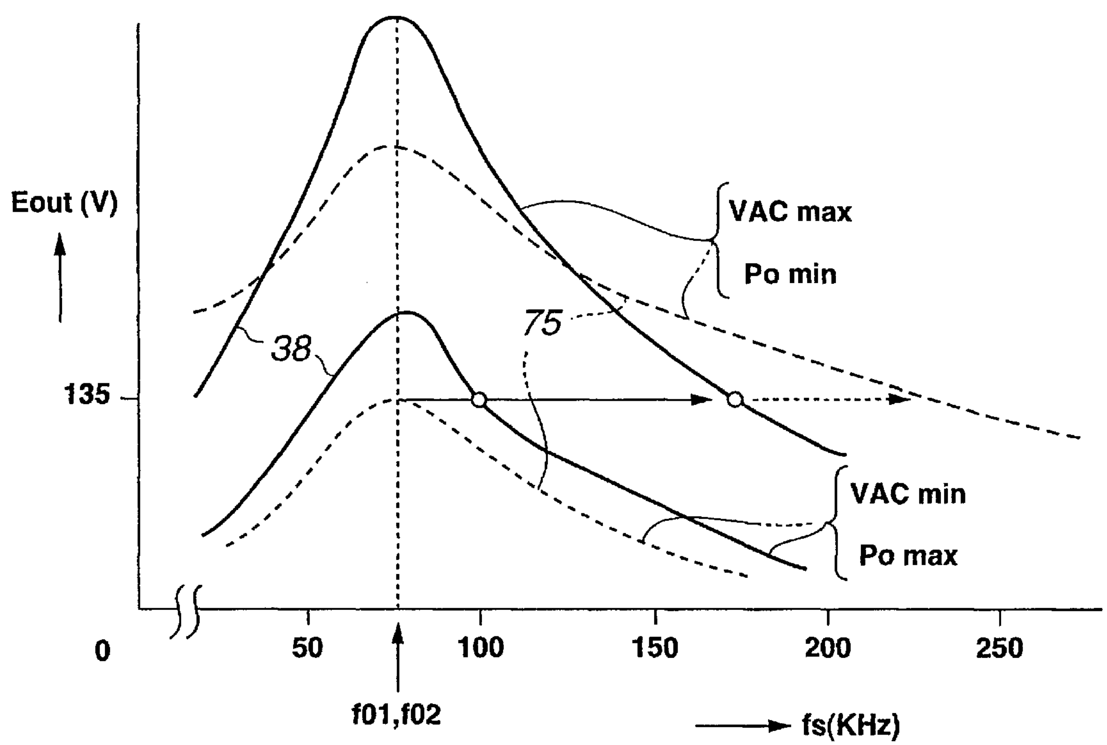
FIG. 4 is a diagram illustrating a relationship between a switching frequency and a secondary side DC output voltage in a power supply of the present invention.
Figure 7:
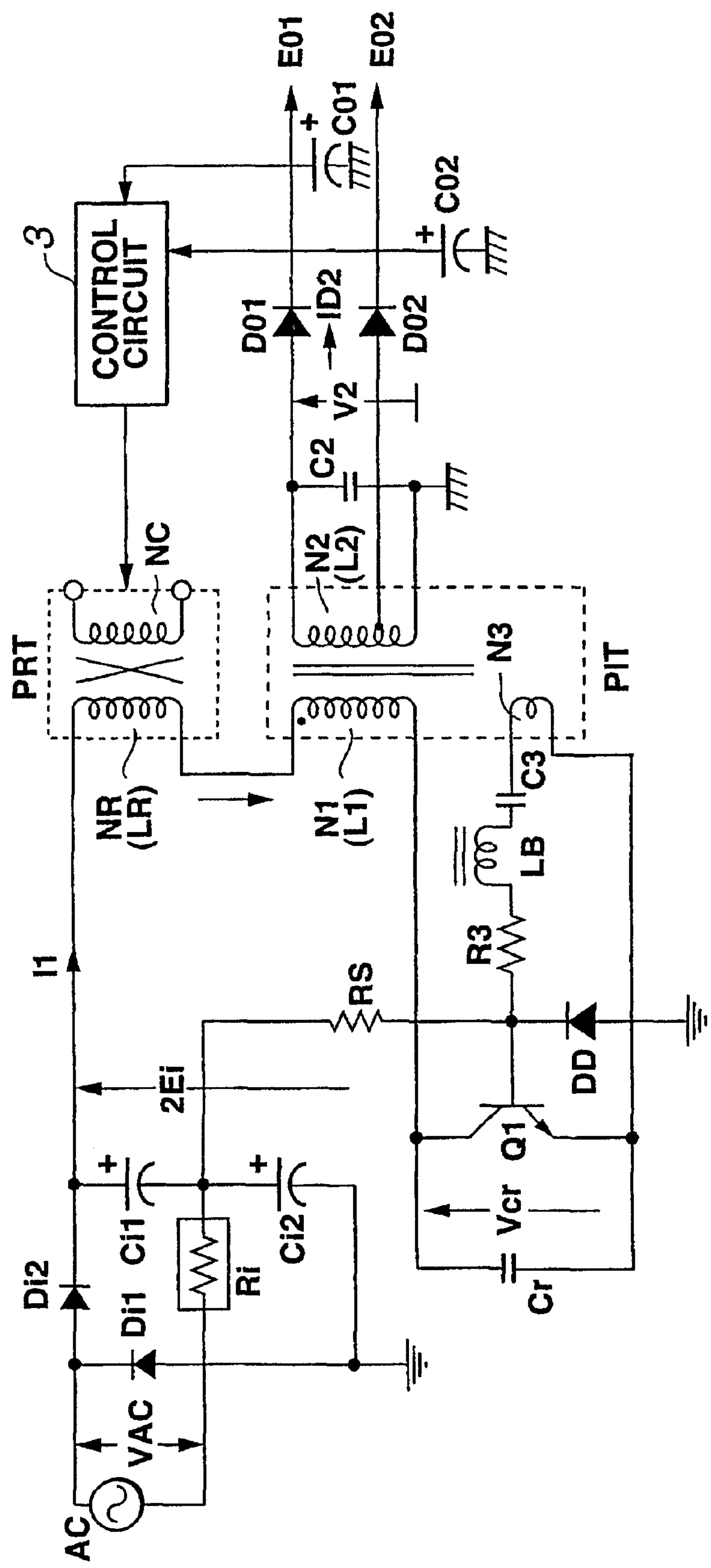
FIG. 7 is a circuit diagram of a related art switching power supply.

FIG. 4 further illustrates the principles of operation of power supply 100. An exemplary relationship between the switching frequency fs and the secondary side DC output voltage (i.e., E0 minus E0') is depicted. (Actually, the shown relationship as depicted by the solid line curve corresponds more closely to the performance realizable in a power supply described in the above-noted co-pending patent application, which does not include the boost up components C1, D1 and T3 of the present invention. By using the boost up components, even better performance is realizable.) In FIG. 4, the abscissa indicates the switching frequency, and the ordinate indicates the level of the secondary side DC output voltage Eout=(Eo−Eo'). A resonance curve of dotted lines 75 illustrates a characteristic in a related art power supply circuit shown schematically in FIG. 7. As can be seen from FIG. 4, for example, in order to make the secondary side DC output voltage Eout a constant voltage so that it may be Eout=135 V in response to a load variation, it is necessary to control the switching frequency fs within a range of 150 KHz from 75 KHz to 225 KHz. However, where the construction of the power supply circuit of FIG. 7 is used as is, the switching frequency of switching element Q1 has a limit approximately at 50 KHz for its voltage withstanding property. In contrast, with the circuit of FIG. 1, the switching frequency fs may be controlled within the range of 75 KHz from 100 KHz to 175 KHz as can be seen from the solid line resonance curve 78 in FIG. 4, and this control range is approximately one half that obtained with the FIG. 7 apparatus.

In power supply 100, if a rise of the AC input voltage VAC of the AC power supply A1 or a drop of the load power occurs, then control is performed (via control circuit 3) so that the switching frequency of the transistor Q1 may be increased by an action of the orthogonal control transformer PRT and another control is performed so that the conduction angle of transistor Q1 may be reduced. Consequently, a voltage resonance pulse voltage Vcp to be applied to the transistor Q1 and the resonance capacitor CR1 exhibits the highest peak value when the switching frequency is lowest while the AC voltage is lowest and the load is highest.

The voltage resonance pulse voltage Vcp is given by $$Vcp=VB[1+(\pi/2)\times(Ton/Toff)]$$

Therefore, if the turn number N3 of boost-up winding T3 and the turn number N2 of secondary winding T2 satisfies N3=N2, for example, when the AC input voltage VAC is 80 V, the potential VB is 220 V, the on time Ton of the transistor Q1 is 3×TOFF and the voltage resonance pulse voltage VCP is 1,250 V. Further, when VAC=120 V, VB=330 V, and Ton=Toff. Consequently, VCP=860 V.

In power supply 100, the apparent AC input voltage is doubled and an increase of the maximum load power is achieved as compared to the case that does not include the boost-up circuitry, namely capacitor C1, diode D1, winding T3 (and resistor Rs1). Therefore, the power supply is effective also where, for example, the maximum load power is 160 W or more. Further, in this case, the voltage withstanding property required for the transistor Q1 can be made 1,500 V or less to allow use of a universal device for transistor Q1, and efficient power conversion can be achieved by use of a device having superior characteristics. For example, an efficiency of 90% or more can be maintained despite variation of the AC input voltage.

Further, where a DC output voltage is obtained by voltage resonance by the circuit of the secondary winding T2 of the insulating converter transformer PIT, if the middle magnetic legs of the EE-shaped ferrite core of the insulating converter transformer PIT are formed shorter than the other outer side magnetic legs to form a gap therebetween so as to provide a loose coupling (for example, the coupling coefficient≈0.85) between the primary Winding and the secondary winding, then the insulating converter transformer PIT becomes less likely to suffer from a saturation condition and the conversion is performed with enhanced stability.

Accordingly, in the above-described power supply, by: 1) applying the positive pole of an input smoothing capacitor to one end of the primary winding of the converter transformer through a diode; 2) winding a predetermined winding contiguously from the one end of the primary winding; and 3) then providing the capacitor between the opposite ends of the thus wound winding to boost up the voltage to be applied to the primary winding, the number of turns of the boost-up winding can be adjusted to arbitrarily set the voltage to be applied to the switching element. Therefore, a desired voltage output can be obtained using a switching element of a desired voltage withstanding property and a device of a superior characteristic can be used to achieve efficient power conversion. Further, the number of parts can be reduced to reduce the area of a circuit board to miniaturize the entire apparatus.

Advantageously, power supply 100 eliminates the above-noted problems of prior art switching power supplies. That is, a conventional power supply apparatus of the self-excited oscillation type is disadvantageous in that there is the possibility that a high voltage may be applied to a switching transistor and, since a device having a high voltage withstanding property is required, a limitation to increase in switching frequency is provided and the power conversion efficiency is deteriorated by an increase of the power loss. Moreover, an apparatus, for example, of the separately excited oscillation type is disadvantageous in that, although the problem of the withstanding voltage of a switching element is eliminated, a greater number of parts are required and a greater area is required for a printed circuit board or the like on which such circuit parts are to be mounted, resulting in a large size of the entire apparatus. On the other hand, with the power supply apparatus of the present invention, these problems can be readily eliminated.

Figure 5:
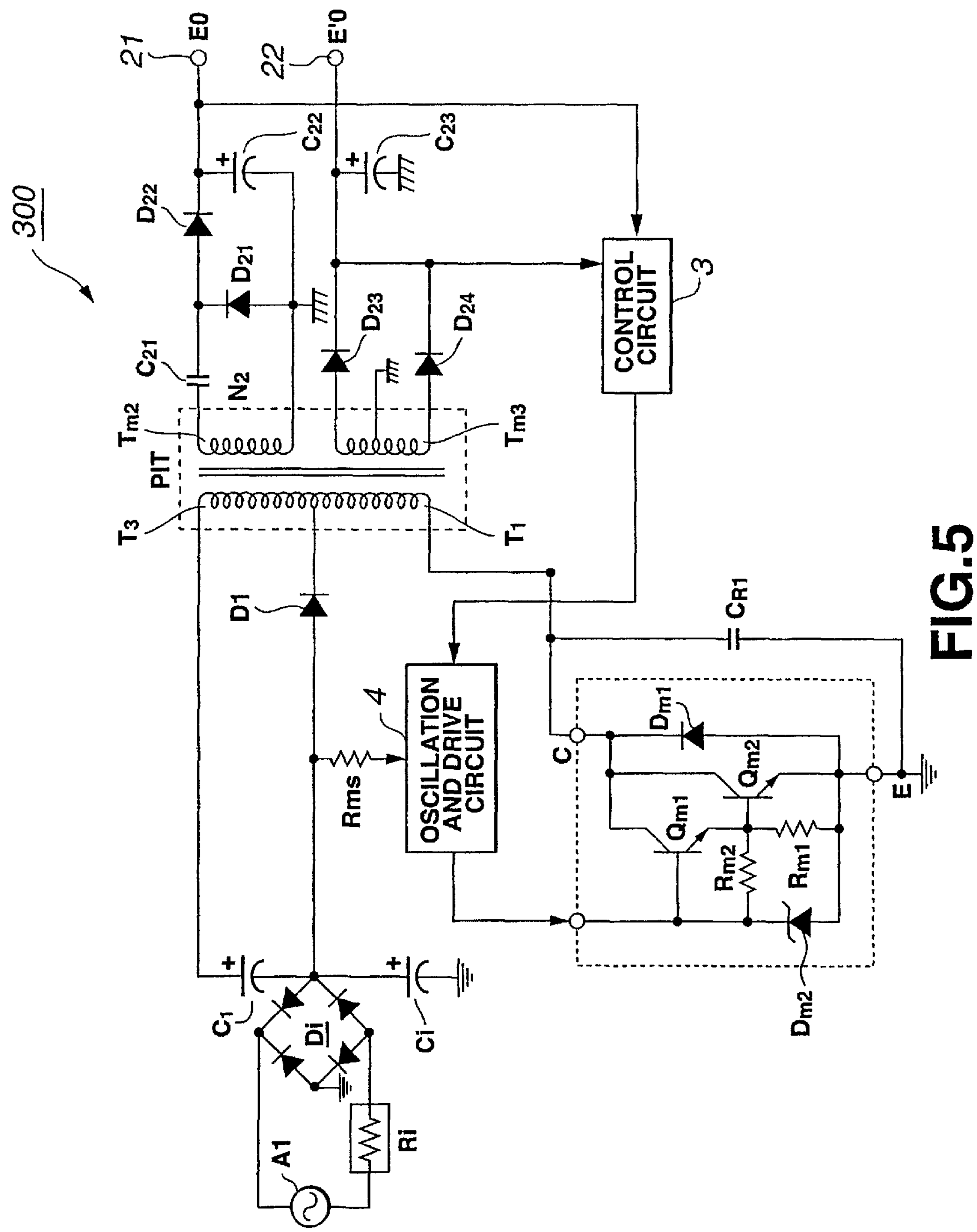
FIG. 5 is a circuit diagram of an alternative embodiment of a power supply in accordance with the invention.

FIG. 5 illustrates an alternative embodiment of a power supply, 300, in accordance with the present invention. Power supply 300 is differs from the power supply apparatus 100 of FIG. 1 in that a pair of transistors Qm1 and Qm2 connected in a Darlington connection are used as the switching element in place of the transistor Q1 described hereinabove. It is to be noted that overlapping description of common components is omitted herein to avoid redundancy.

In power supply 300, the lower end of primary winding T1 of the insulating converter transformer PIT described hereinabove is grounded through the collector-emitter of the transistor Qm2 connected in a Darlington connection, and a resonance capacitor CR1 is connected in parallel to the collector-emitter of the transistor Qm2 together with a damping diode Dm1. The collector of transistor Qm1 is connected to the collector of transistor Qm2, and the emitter of the transistor Qm1 is connected to the base of transistor Qm2. Also, resistors Rm1 and Rm2 are connected to the bases and the emitters of the transistors Qm1 and Qm2, respectively, and the base of the transistor Qm1 is connected to the emitter of the transistor Qm2 through a damping diode Dm2.

A control signal from control circuit 3 is supplied to an oscillation and drive circuit 4, and a driving signal from the oscillation and drive circuit 4 is supplied to the base of the transistor Qm1. It is to be noted that, in this instance, isolated signal transmission means such as a photo-coupler is required between the control circuit 3 and the oscillation and drive circuit 4. Further, a voltage on the positive electrode side of the smoothing capacitor Ci described above is supplied to the oscillation and drive circuit 4 through a starting resistor Rms. Consequently, the oscillation and drive circuit 4 forms a drive signal modulated in frequency and pulse width, for example, in accordance with the control signal from the control circuit 3 described above. The drive signal is supplied to the base of the transistor Qm1 of the transistors Qm1 and Qm2 connected in a Darlington connection.

Accordingly, also in the power supply apparatus of FIG. 5, by applying the positive pole of an input smoothing capacitor to one end of the primary winding of the converter transformer through a diode and winding a predetermined winding contiguously from the one end of the primary winding and then providing the capacitor between the opposite ends of the thus wound winding to boost up the voltage to be applied to the primary winding, the number of turns of the boost-up winding can be adjusted to arbitrarily set the voltage to be applied to the switching element, and a desired output can be obtained using a switching element of a desired voltage withstanding property and a device of a superior characteristic can be used to achieve efficient power conversion. Also, the load power can be increased by virtue of the boosted-up voltage applied to transformer PIT. Further, the number of parts can be reduced to reduce the area of a circuit board to miniaturize the entire apparatus.

It is to be noted that, for the switching element used in the power supply apparatus described hereinabove with reference to FIGS. 1 and 5, as an alternative to using a single npn bipolar transistor for switching or transistors connected in a Darlington connection (Darlington BJTs) as described above, a MOSFET(Metal Oxide Semiconductor Field Effect Transistor), an IGBT (insulated gate bipolar transistor), a SIT (electrostatic induction thyristor) or the like can be used.

Further, in the power supply apparatus of FIG. 5, extraction of the dc output voltage from the insulating converter transformer PIT is performed by a voltage multiplying rectification system wherein a current resonance circuit formed from a series connection of a secondary winding and a resonance capacitor is used. In particular, in this case, diodes D21 and D22 connected in series in a forward direction from the grounded end of the secondary side toward an output terminal 21 are provided. An end of the secondary winding Tm2 of the insulating converter transformer PIT is grounded on the secondary side, and the other end of secondary winding Tm2 is connected to a junction between the diodes D21 and D22 through a capacitor C21. Further, a capacitor C22 is connected in parallel to the series circuit of the diodes D21 and D22.

Further, the center tap of a secondary winding Tm3 is grounded on the secondary side, and taps at the opposite ends of the secondary winding Tm3 are connected to each other through forwardly directed diodes D23 and D24. A junction between them is grounded on the secondary side through a capacitor C23 for smoothing, and another output terminal 22 is led out from the junction.

Consequently, a DC output voltage of a multiplied voltage can be obtained from the current resonance circuit of the secondary winding Tm2. Further, an output between the arbitrary intermediate taps of the secondary winding Tm3 is full-wave rectified and a desired dc output voltage is extracted. Further, in the power supply apparatus, a desired output can be obtained using a switching element of a desired voltage withstanding property and a device with superior characteristics can be used to achieve efficient power conversion. Furthermore, the number of parts can be reduced to reduce the area of a circuit board to miniaturize the entire apparatus.

Figure 6A:
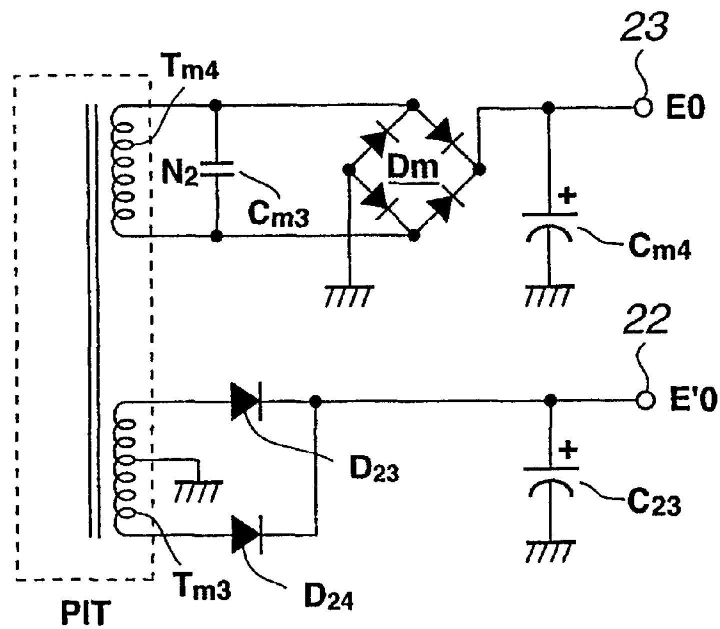
FIGS. 6A and 6B are circuit diagrams showing alternative output circuit portions of power supplies in accordance with the invention.

FIG. 6A shows a circuit wherein extraction of a DC output voltage from an insulating converter transformer PIT is performed by full-wave rectification using bridge rectification with a voltage resonance circuit wherein a resonance capacitor is connected in parallel to the secondary winding. (Note that the circuits of FIG. 6A or 6B can be used to replace the output circuitry in the power supplies 100 or 300 of FIGS. 1 and 5, respectively.) In the circuit shown, a resonance capacitor Cm3 is connected between the opposite ends of a secondary winding Tm4 of the insulating converter transformer PIT and connected to AC input terminals of a diode bridge circuit Dm. A rectifier output terminal of the negative electrode side of the diode bridge circuit Dm is grounded on the secondary side, and the other rectifier output terminal of the positive electrode side is grounded on the secondary side through a capacitor Cm4 for smoothing. Further, an output terminal 23 is provided at the latter rectifier output terminal of the positive electrode side of the diode bridge circuit Dm.

Consequently, a DC output voltage can be obtained by full-wave rectification using bridge rectification with a voltage resonance circuit formed for the secondary winding Tm4. Further, also in the circuit shown in FIG. 6A, a desired output can be obtained using a switching element of a desired voltage withstanding property and a device of a superior characteristic can be used to achieve efficient power conversion. Furthermore, the number of parts can be reduced to reduce the area of a circuit board to miniaturize the entire apparatus.

Figure 6B:
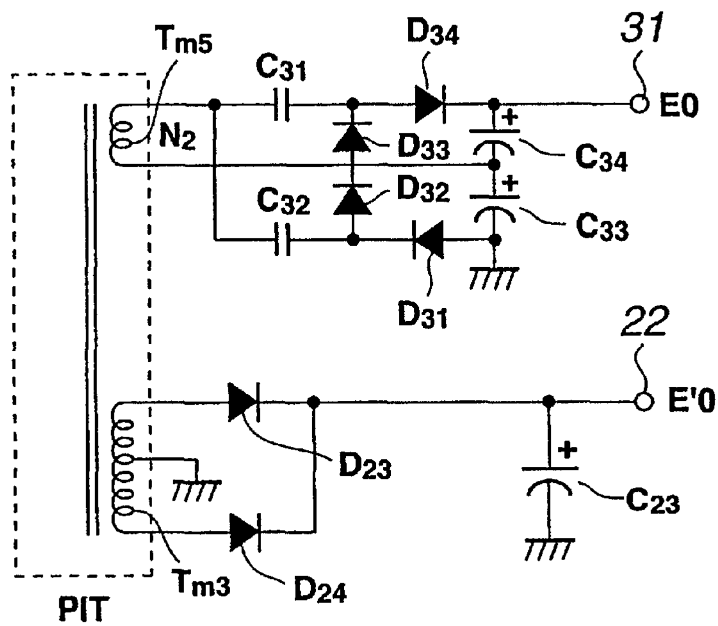

FIG. 6B shows another circuit wherein extraction of a DC output voltage from the insulating converter transformer PIT is performed by a quadruple voltage rectification system wherein a current resonance circuit composed of a series connection of two resonance capacitors to the secondary winding is used. In particular, in the circuit shown in FIG. 6B, diodes D31, D32, D33 and D34 connected in series in a forward direction from the grounded end of the secondary side toward the output terminal 31 are provided. An end of a secondary winding Tm5 of the insulating converter transformer PIT is connected to a junction of the diodes D32 and D33, and the other end of the secondary winding Tm5 is connected to a junction of the diodes D31 and D32 and a junction of the diodes D33 and D34 through capacitors C31 and C32, respectively.

Further, a capacitor C33 is connected in parallel to the series circuit of the diodes D31 and D32, and another capacitor C34 is connected in parallel to the series circuit of the diodes D33 and D34. Consequently, a DC output voltage of a quadruple voltage can be obtained from the current resonance circuit of the secondary winding Tm5. Also in the circuit shown in FIG. 6B, a desired output can be obtained using a switching element of a desired voltage withstanding property and a switching device (transistor) with superior characteristics can be used to achieve efficient power conversion. Furthermore, the number of parts can be reduced to reduce the area of a circuit board to miniaturize the entire apparatus.

While the present invention has been described above in reference to preferred embodiments thereof, it is understood that these embodiments are merely exemplary and that one skilled in the art can make many changes to the disclosed embodiments without departing from the spirit and scope of the invention as defined by the appended claims.

Industrial Applicability

As described above, a power supply according to the present invention includes a converter transformer having primary and secondary windings loosely coupled to one another, and an auxiliary winding with a predetermined number of turns wound contiguously from one end of the primary winding to an end portion of the converter transformer. An input voltage smoothing capacitor is connected on one side to an end of the primary winding of the converter transformer through a forwardly directed diode. A switching element is connected to the other end of the primary winding. A control circuit controls the switching element to perform switching so that an output voltage of the secondary winding has a predetermined voltage value (or is within a predetermined voltage range). A second capacitor is coupled across opposite ends of the auxiliary winding via the forwardly directed diode, to boost-up voltage applied to the converter transformer. Thus, with the power supply according to the present invention, a desired conversion output can be obtained using a switching element of a desired voltage withstanding property.

What is claimed is:

1. A power supply comprising:

a converter transformer having primary and secondary windings loosely coupled to one another, and an auxiliary winding with a predetermined number of turns wound contiguously from one end of said primary winding to an end portion of said converter transformer;

an input voltage smoothing capacitor having one side thereof connected to an end of said primary winding of said converter transformer through a forwardly directed diode;

a switching element connected to the other end of said primary winding of said converter transformer;

control means for controlling said switching element to perform switching so that an output voltage of said secondary winding has a predetermined voltage value; and a second capacitor coupled across opposite ends of said auxiliary winding via said forwardly directed diode, to boost-up voltage applied to said converter transformer.

2. The power supply of claim 1, wherein said converter transformer comprises:

an EE-shaped ferrite core having a pair of middle magnetic legs shorter than two pairs of outer magnetic legs thereof such that a gap is formed between said pair of middle magnetic legs, said primary winding being wound around one of said middle magnetic legs, said secondary winding being wound around the other of said middle magnetic legs, so as to provide said loose coupling between said primary and secondary windings.

3. The power supply of claim 1, further comprising a resonance capacitor connected in parallel across said secondary winding of said converter transformer to form a voltage resonance circuit, wherein a DC output voltage is obtained by full-wave rectification using a center tap of said secondary winding.

4. The power supply of claim 1, further comprising a resonance capacitor connected in series to said secondary winding to form a current resonance circuit, wherein a DC output voltage is obtained by a voltage multiplying rectification means.

5. The power supply of claim 1, wherein a resonance capacitor is connected in parallel to said secondary winding of said converter transformer to form a voltage resonance circuit, and a DC output voltage is obtained by full-wave rectification using bridge rectification.

6. The power supply of claim 1, wherein a pair of resonance capacitors are connected in series to said secondary winding of said converter transformer to form a current resonance circuit, and a DC output voltage is obtained by a quadruple voltage rectification means.

7. The power supply of claim 1, wherein said control means is formed as a self-excited oscillation switching frequency control means for varying an inductance of a control transformer with an output voltage of said secondary winding to control an oscillation frequency.

8. The power supply according to claim 1, wherein said control means is formed as separately excited oscillation switching frequency control means for detecting the output voltage of said secondary winding and controlling an oscillation frequency of an oscillation circuit with the detected value.

* * * * *